(12) United States Patent
Kerstan et al.

(10) Patent No.: US 8,111,396 B2
(45) Date of Patent: Feb. 7, 2012

(54) SPECTROMETRIC MEASUREMENT SYSTEM AND METHOD FOR COMPENSATING FOR VEILING GLARE

(75) Inventors: Felix Kerstan, Jena (DE); Nico Correns, Weimar (DE); Joerg Margraf, Paulinzella (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 483 days.

(21) Appl. No.: 12/225,904

(22) PCT Filed: Mar. 12, 2007

(86) PCT No.: PCT/EP2007/002128
§ 371 (c)(1),
(2), (4) Date: Oct. 1, 2008

(87) PCT Pub. No.: WO2007/115628
PCT Pub. Date: Oct. 18, 2007

(65) Prior Publication Data
US 2009/0168060 A1    Jul. 2, 2009

(30) Foreign Application Priority Data
Apr. 1, 2006    (DE) .................. 10 2006 015 269

(51) Int. Cl.
*G01J 3/28* (2006.01)
*G01J 3/36* (2006.01)
(52) U.S. Cl. ...................... 356/326; 356/328
(58) Field of Classification Search .................. 356/326, 356/328
See application file for complete search history.

(56) References Cited

U.S. PATENT DOCUMENTS
4,687,329 A    8/1987    Schultz
(Continued)

FOREIGN PATENT DOCUMENTS
DE    1 909 841    10/1969
(Continued)

OTHER PUBLICATIONS
XP-010804375 / Wanqing, et al."Modelling of Color Cross-Talk in CMOS Inage Sensors" pp. 3576-3579, 2002 IEEE International Conference on Aqoustics, Speech, and Signal Processing, May 13, 2002 vol. 4 of 4.

*Primary Examiner* — F. L. Evans
(74) *Attorney, Agent, or Firm* — Frommer Lawrence & Haug LLP

(57) ABSTRACT

The present solution is directed to a measuring system and a method for determining spectrometric measurement results with high accuracy. The spectrometric measuring system, comprises a radiation source, an entrance slit, a dispersion element, and a detector with detector elements arranged in a linear or matrix-shaped manner in one or more planes. The detector has an even distribution of at least two different wavelength-selective filters on its detector elements. While detectors from photography and video applications are used for this purpose, use of the invention is not limited to the visible spectral region. Further, color filters on the pixels may be omitted or modified in the manufacturing process. It is also possible to use other types of detectors in which the wavelength-selective filters and associated detectors are arranged one behind each other in a plurality of planes in which complete color information is available to each individual picture point.

18 Claims, 3 Drawing Sheets

U.S. PATENT DOCUMENTS

| | | |
|---|---|---|
| 5,128,549 A | 7/1992 | Kaye |
| 5,533,145 A * | 7/1996 | Shofner et al. ............ 356/328 |
| 6,181,418 B1 | 1/2001 | Palumbo et al. |
| 6,700,664 B1 | 3/2004 | Honda et al. |
| 7,106,440 B2 | 9/2006 | Granger |
| 2005/0219525 A1 | 10/2005 | Granger |

FOREIGN PATENT DOCUMENTS

| | | |
|---|---|---|
| DE | 36 86 184 | 2/1993 |
| DE | 196 20 541 | 11/1997 |
| EP | 0 195 339 | 9/1986 |
| EP | 0 449 442 | 10/1991 |
| GB | 1 258 504 | 12/1971 |

* cited by examiner

SPECTROMETRIC MEASUREMENT SYSTEM AND METHOD FOR COMPENSATING FOR VEILING GLARE

The present application claims priority from PCT Patent Application No. PCT/EP2007/002128 filed on Mar. 12, 2007, which claims priority from German Patent Application No. DE 10 2006 015 269.7 filed on Apr. 1, 2006, the disclosure of which is incorporated herein by reference in its entirety.

BACKGROUND OF THE INVENTION

1. Field of the Invention

The present invention is directed to a measuring system and to a method for determining spectrometric measurement results with high accuracy.

2. Description of Related Art

To detect the light at the output of multichannel spectrometers, detectors which are sensitive within the entire spectral range acquired by the spectrometer are generally used according to the prior art. The multichannel detectors comprise a plurality of detector elements, also called pixels, which are arranged in arrays or matrices.

A determined partial region of the total spectral region whose light output is to be measured is associated with each pixel. Since the separation of light into its spectral components is never accomplished completely, a broadband detector of the kind mentioned above always acquires a certain proportion of light from a different spectral region not associated with the pixel in the form of false light or veiling glare, as it is called. This leads to inaccurate measurement results.

In grating spectrometers, light from diffraction orders other than veiling glare can also be acquired. Various steps to minimize the proportion of veiling glare or mutual crosstalk of spectral channels are known.

For example, U.S. Pat. No. 6,181,418 B1 describes a concentric spectrometer which has a special surface referred to as a "light trap" for reducing stray light. This light trap is integrated in the design of the imaging optics and is formed as a beveled surface. The light trap is a surface specifically designed to eliminate or mitigate stray light generated from the entrance slit. It is intended to prevent stray light, including light of different diffraction orders, from being imaged on the detector. The light trap is a beveled surface with nonreflecting, absorbent or scattering characteristics. In order to eliminate the greatest possible proportion of stray light, the beveled surface of the imaging optics is rendered coarse and additionally is coated with an optically absorbent material. In addition to this beveled surface, the inner surface of the housing of the concentric spectrometer is formed in a corresponding manner, the mechanical properties of the material such as elasticity, strength and heat resistance being crucial in the selection of material.

U.S. Pat. No. 6,700,664 B1 describes a device by means of which light beams are selectively split through linear variable filters (LVF) and transmitted to a photodetector array so as that the spectral characteristics of the transmitted light can be determined. Linear variable filters (LVF) are formed on a substrate by optical thin-film layers, and the thickness of the individual layers can vary. The LVF can be designed either as a bandpass filter or as a high/low-cut filter. The width of the selectively split light beams can be adapted to the detector so that they approximately correspond to the pixel width. It is disadvantageous in this solution that the LVF cannot be arranged on the surface of the detector array because this is difficult to accomplish owing to the sensitive surface of the detector array and the wiring of the detector array. Therefore, the different LVF elements are set on a carrier disk that is arranged at a distance of several millimeters from the detector array. Micro-objectives which focus the optical light beams on the pixels of the detector array are used to reduce the influence of unwanted light. On one hand, this makes the construction of the device more complicated; on the other hand, the micro-objectives can in turn cause additional light scattering.

In contrast to the latter, in the monolithic miniature spectrometer by Carl Zeiss Jena GmbH (Type MMS), order filters are arranged directly on the detector elements.

The problem in all of the solutions mentioned above is that it is always only possible to minimize the veiling glare, but an independent acquisition and/or compensation is not possible. Further disadvantages of the solutions mentioned above include increased resources on hardware owing to additional structural components in the spectrometer or additional optical layers on the detector.

SUMMARY OF THE INVENTION

It is the object of the present invention to develop a spectrometric measuring system and a method by which the measurement results can be compensated for with respect to veiling glare without requiring increased expenditure on apparatus.

According to the invention, this object is met through the features of the independent claims. Preferred further developments and constructions are indicated in the dependent claims.

The above-stated object is met according to the invention in that a detector with pixels arranged in linear shape or matrix shape and with an even distribution of different wavelength-selective filters (color filters) on the pixels is used for detecting the light at the spectrometer output. The detector can be a color camera known from photography applications or video applications, Such color cameras are very inexpensive because they are manufactured in very large quantities and in some cases are less expensive than corresponding black-and-white cameras which are only manufactured for special applications.

Use of the invention is not limited to the visible spectral region. If required, the color filters on the pixels may sometimes be omitted or modified in the last step of manufacturing the color camera in order to optimize them for the required spectral region.

But it is also possible to use other types of detectors in which the wavelength-selective filters and the associated detectors are arranged one behind the other in a plurality of planes, e.g., in the so-called X3 image converter by the US firm Foveon, Inc. In contrast to conventional image converters, complete color information is available for every individual image point.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The spectrometric measuring system according to the invention with compensation for veiling glare comprises at least one radiation source, at least one entrance slit, a dispersion element, and a detector with detector elements arranged in a linear or matrix-shaped manner in one or more planes. The detector has an even distribution of at least two different wavelength-selective filters on its detector elements. In particular, color camera sensors known from photography applications and video applications can be used as detectors.

Figures 1, 2:
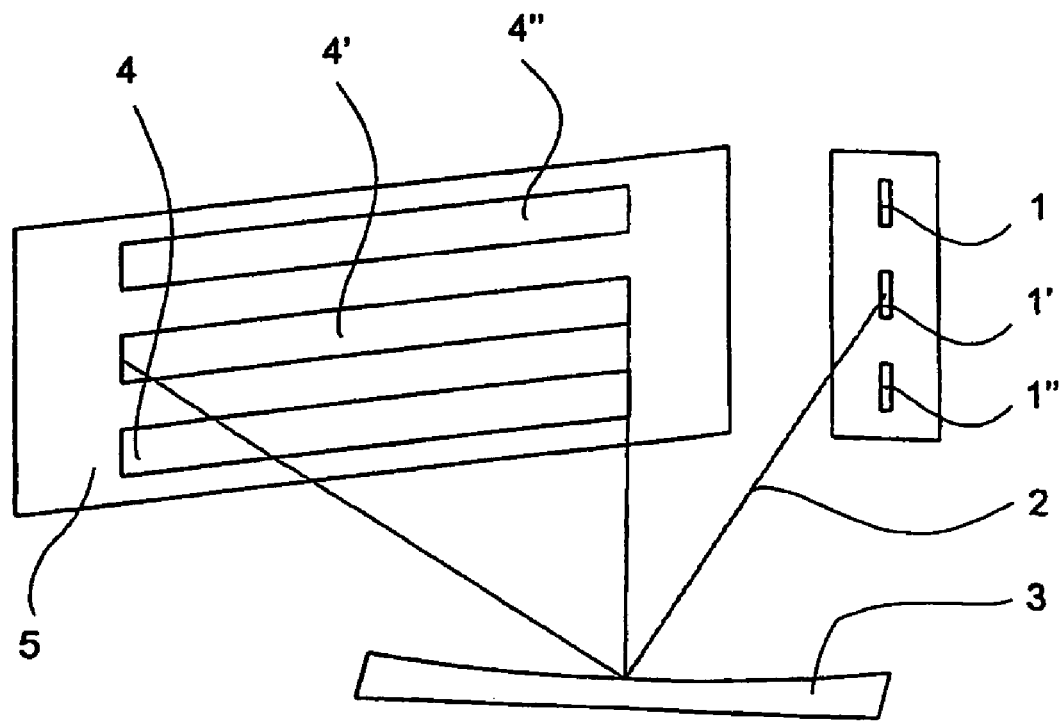
FIG. 1 shows a color camera sensor with an even distribution of four different wavelength-selective filters.
FIG. 2 shows a spectrometer arrangement with three entrance slits which are oriented parallel to the grating lines.

FIG. 1 shows a color camera sensor with an even distribution of four different wavelength-selective filters which are arranged in a quadratic pattern. The detector uses, for example, the colors cyan (Cy), yellow (Ye), green (Gn) and magenta (Mg). A control unit 7 (see FIG. 5) is arranged downstream of the detector for determining, evaluating or storing the signal values of the different-colored detector elements.

A diffraction grating or dispersion prism is used in a known manner as a dispersion element. The entrance slit or entrance slits is/are oriented parallel to the grating lines or to the roof edge of the dispersion prism so that the partial spectra imaged on the detector have the same wavelength correlation (see FIG. 2).

Figure 3:
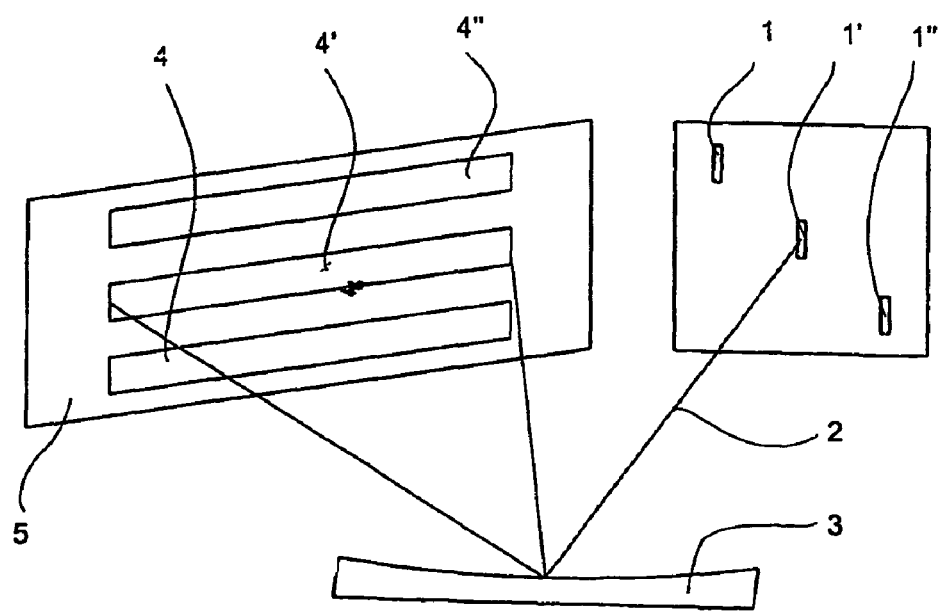
FIG. 3 shows a spectrometer arrangement with three entrance slits which are oriented parallel to the grating lines and are offset relative to one another.

In another constructional variant, the entrance slit or entrance slits is/are oriented in an offset manner relative to a parallel line to the grating lines or to the roof edge of the dispersion prism so that the partial spectra of every entrance slit formed on the detector can acquire different partial regions of a total spectral region (see FIG. 3).

The control unit arranged downstream of the detector is capable of determining spectral intensity values $I_i$ of the detector elements with identical color filters transverse to the dispersion direction as weighted sums, electively with or without compensation for crosstalk.

In the method according to the invention for compensation of veiling glare in a spectrometric measuring system, the light from at least one radiation source is imaged by at least one entrance slit and a dispersion element on a detector with detector elements arranged in a linear or matrix-shaped manner in one or more planes. A detector having an even distribution of different wavelength-selective filters on the detector elements is used.

A diffraction grating or a dispersion prism is preferably used as a dispersion element. The detector has an evenly distributed arrangement of at least two wavelength-selective filters and corresponds, for example, to the color camera sensors known from photography applications and video applications. FIGS. 2 and 3 each show a variant of a spectrometer arrangement with imaging gratings.

A control unit arranged downstream of the detector undertakes the determination, evaluation or storage of the signal values of the differently colored detector elements.

In a first variant, the entrance slit or entrance slits is/are arranged parallel to the grating lines or to the roof edge of the dispersion element.

In this connection, FIG. 2 shows a spectrometer arrangement in which three entrance slits are oriented parallel to the grating structure of the dispersion element so that the light 2 coming from the three entrance slits 1, 1' and 1" is imaged on the detector 5 by the diffraction grating 3 in the form of three partial spectra 4, 4' and 4". Each partial spectrum 4, 4' and 4" has the same wavelength scale. When using different radiation sources for the entrance slits 1, 1' and 1", the partial spectra are associated with the individual radiation sources. With the same radiation source, the partial spectra can be added to reduce noise.

Figure 5:
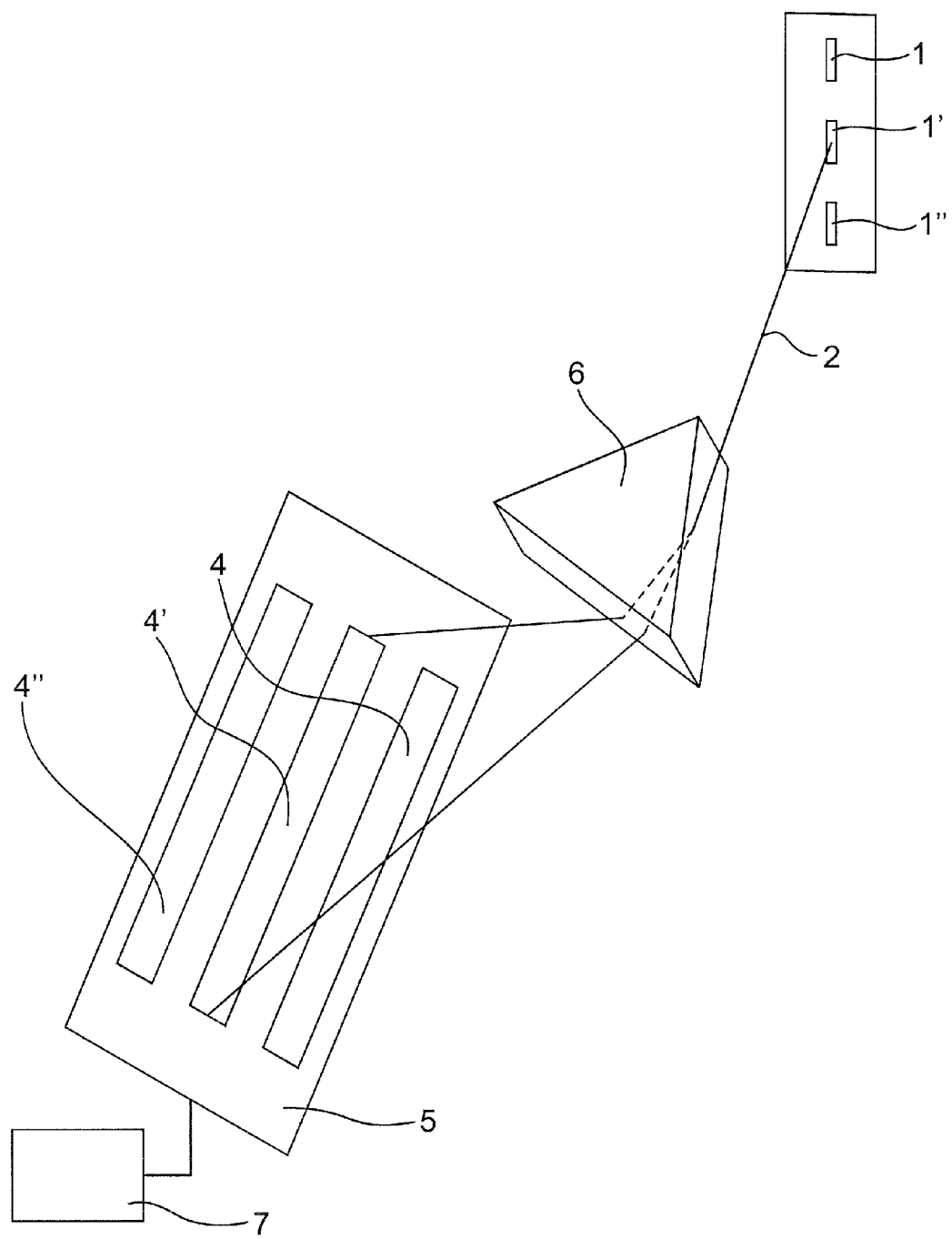
FIG. 5 shows a spectrometer arrangement having a control unit, and using a prism instead of a diffraction grating.

In a second variant, the entrance slits are oriented in an offset manner relative to a parallel line to the grating lines or to the roof edge of the dispersion prism 6 (see FIG. 5).

In this connection, FIG. 3 shows a spectrometer arrangement with three entrance slits oriented so as to be offset relative to one another parallel to the grating lines so that light 2 coming from the three entrance slits 1, 1' and 1" is imaged on the detector 5 by the dispersion element 3 in the form of three partial spectra with different partial regions 4, 4' and 4" of a total wavelength range. The partial spectra 4, 4' and 4" imaged on the detector 5 are acquired separately by the control unit 7 (see FIG. 5) and joined to form a spectrum comprising the entire wavelength region.

A prism whose dispersion direction is oriented perpendicular to the diffraction grating can be used in addition to the diffraction grating. Since the diffraction grating is dimensioned in such a way that a plurality of diffraction orders of the spectral region to be imaged impinge on the detector, the additional prism, in accordance with the solution described in DE 1 909 841 C2, serves to separate the diffraction orders.

For purposes of signal processing, the net signal values $S_{i,k}$ of every detector element are determined by the control unit as the difference of the light signal and dark signal, and the sum of the spectral intensity values $I_i$ is determined for detector elements with the identical color filter transverse to the dispersion direction. The determination of the net signal values $S_{i,j}$ is carried out under otherwise identical conditions for every pixel of the detector, where i is the column number and j is the row number. Both the dark current and electronic null signal are eliminated by the determination of the net signal values $S_{i,k}$.

Since the individual imaged spectra have different color filters (k=color filter number) in the dispersion direction (horizontal, index i), the net signal values $S_{i,j}$ are initially summed with the same centroid in the dispersion direction and the same color filter (color filter number k) transverse to the dispersion direction. A weighted summing is then carried out in such a way that the same weighted signals are associated with the same wavelength index and the same color index.

For a detector according to FIG. 1 with an even distribution of four different wavelength-selective filters (cyan—Cy, yellow—Ye, green—Gn, and magenta—Mg) arranged in a quadratic pattern, the weighted net signal values $S_{i,k}$ are determined as follows:

$$Cy(k=1): S_{i,1} = 3 \cdot (s_{i,1} + s_{i,3}) + (s_{i+2,1} + s_{i+2,3})$$

$$S_{i+1,1} = (s_{i,1} + s_{i,3}) + 3 \cdot (s_{i+2,1} + s_{i+2,3})$$

$$Ye(k=2): S_{i,2} = (s_{i-1,1} + s_{i-1,3}) + 3 \cdot (s_{i+1,1} + s_{i+1,3})$$

$$S_{i+1,2}=3\cdot(s_{i+1,1}+s_{i+1,3})+(s_{i+3,1}+s_{i+3,3})$$

$$Gn(k=3): S_{i,3}=4\cdot(s_{i,2}+s_{i+1,4}) \quad S_{i+1,3}=4\cdot(s_{i+1,4}+s_{i+2,2})$$

$$Mg(k=4): S_{i,4}=4\cdot(s_{i,4}+s_{i+1,2}) \quad S_{i+1,4}=4\cdot(s_{i+1,2}+s_{i+2,4})$$

The formulas for summing a total of four rows is shown by way of example. For detectors with a greater quantity of columns and rows, the formulas must be amended in a corresponding manner. The quantity of net signal values $S_{i,k}$ per color in the dispersion direction is doubled through this method step.

In the variant of the detector with wavelength-selective pixels in a respective plane (index k), only the net signal values of every column are summed.

$$S_{i,k} = \sum_{j} S_{i,j,k}$$

Subsequently, the spectral intensity values $I_i$ of the detector elements with the identical color filter transverse to the dispersion direction are determined by the control unit as a weighted sum:

$$I_i = \sum_{k=1}^{n} G_{i,k} \cdot S_{i,k},$$

where
$I_i$ is the spectral intensity value in column i,
$G_{i,k}$ is the weight factor of the color filter k in column i,
$S_{i,k}$ is the net signal value of the color filter k in column i,
k is the number of the color filter, and
n is the quantity of color filters.

In another embodiment, the spectral intensity values $I_i$ of the detector elements with the same color filter transverse to the dispersion direction are determined by the control unit as a weighted sum without compensating for crosstalk by taking into account the following weight factors:

$$G_{i,k} = \frac{R_k(\lambda_i)}{\sum_{l=1}^{n} R_l^2(\lambda_i)},$$

where
$R_k(\lambda_i)$ is the relative spectral sensitivity of the color filter k,
$\lambda_i$ is the effective wavelength,
i is the column number of the detector,
k is the number of the color filter, and
n is the quantity of color filters.

Figure 4:
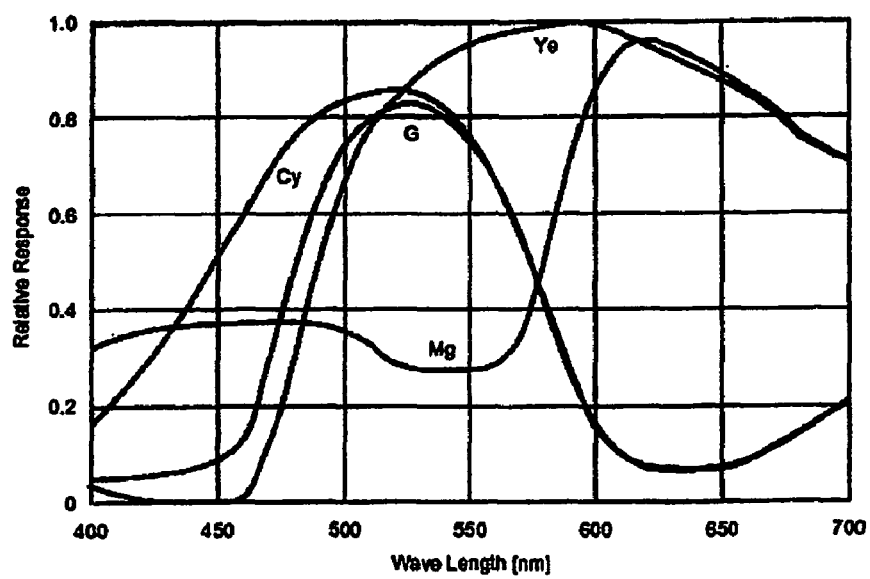
FIG. 4 illustrates the relative sensitivity of the color filters k as a function of the (effective) wavelength associated with the pixel if.

In this connection, FIG. 4 shows the relative sensitivity of the color filters k as a function of the (effective) wavelength $\lambda_i$ associated with the pixel i.

The signal with the least sensitivity in the effective wavelength $\lambda_i$ is suitable for compensating for crosstalk. The corresponding weight factor must then become negative. The magnitude of the negative compensation value must be optimized for the given spectrometer and application based on different samples which are sensitive to stray light.

The solution according to the invention for compensation of veiling glare in a spectrometric measuring system makes it possible to optimize the spectrometer for a maximum signal-to-noise ratio or minimum mutual crosstalk without changing the apparatus construction, depending on the application, merely by changing the weight factors G.

By using a plurality of entrance slits, either the spectra of a plurality of light sources or a plurality of portions of the spectrum of a light source can be imaged on the detector. In both cases, every entrance slit generates a spectrum trace on the detector. The calculation of the spectral intensity values is carried out in the manner described separately for every trace. The summing in the column direction is then limited to the region of every trace. Summing limits can be adapted in case of imperfect orientation of the grating lines to the detector or in case of wavelength-dependent stigmatism depending on the column number i. This renders the results unsusceptible to manufacturing tolerances and imaging errors.

It is particularly advantageous to use color camera detectors known from photography applications and video applications. Such color cameras are very inexpensive because they are manufactured in very large quantities and in some cases are less expensive than corresponding black-and-white cameras which are only manufactured for special applications.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A spectrometric measuring system for compensation for veiling glare, comprising:
    at least one radiation source;
    at least one entrance slit;
    a dispersion element;
    a detector with detector elements arranged in a linear or matrix-shaped manner; and
    a control unit;
    wherein the detector has an even distribution of different wavelength-selective filters on its detector elements; and
    wherein the control unit is capable of determining spectral intensity values of the detector elements with identical wavelength-selective filters transverse to the dispersion direction as weighted sums.

2. The spectrometric measuring system according to claim 1;
    wherein the detector has an evenly distributed arrangement of at least two wavelength-selective filters.

3. The spectrometric measuring system according to claim 1;
    wherein a color camera sensor is used as a detector.

4. The spectrometric measuring system according to claim 3;
    wherein the dispersion element is an imaging holographic grating or a dispersion prism.

5. The spectrometric measuring system according to claim 1;
    wherein both an imaging holographic grating and a dispersion prism are used.

6. The spectrometric measuring system according to claim 1;
    wherein the control unit is arranged downstream of the detector for determining, evaluating, or storing the signal values of different-colored detector elements.

7. The spectrometric measuring system according to claim 1, further comprising:
  at least one other entrance slit;
  wherein the at least one entrance slit and the at least one other entrance slit are oriented perpendicular to a grating structure or to a roof edge of the dispersion element and are offset relative to one another so that the partial spectra imaged on the detector can be joined by the control unit to form a spectrum.

8. The spectrometric measuring system according to claim 1;
  at least one other entrance slit;
  wherein the at least one entrance slit and the at least one other entrance slit are oriented parallel to a grating structure or a roof edge of the dispersion element so that the partial spectra of each entrance slit which are imaged on the detector are acquired separately by the control unit and can be associated with the individual radiation sources when different radiation sources are used.

9. The spectrometric measuring system according to claim 1;
  wherein the control unit is capable of determining spectral intensity values $I_i$ of the detector elements with identical wavelength-selective filters transverse to the dispersion direction as weighted sums, selectively with or without compensation for crosstalk.

10. A method for compensation of veiling glare in a spectrometric measuring system;
  wherein the light from at least one radiation source is imaged by at least one entrance slit and a dispersion element on a detector with detector elements arranged in a linear or matrix-shaped manner;
  wherein a detector having an even distribution of different wavelength-selective filters on the detector elements is used; and
  wherein the spectral intensity values $I_i$ of the detector elements with the identical wavelength-selective filter transverse to the dispersion direction are determined by a control unit as a weighted sum:

$$I_i = \sum_{k=1}^{n} G_{i,k} \cdot S_{i,k},$$

where:
  $I_i$ is the spectral intensity value in column i,
  $G_{i,k}$ is the weight factor of the wavelength-selective filter k in column i,
  $S_{i,k}$ is the net signal value of the wavelength-selective filter k in column i,
  i is the column number of the detector,
  k is the number of the wavelength-selective filter, and
  n is the quantity of wavelength-selective filters; or
  wherein the spectral intensity values $I_i$ of the detector elements with the identical wavelength-selective filter transverse to the dispersion direction are determined by the control unit as a weighted sum without compensating for crosstalk by taking into account the following weight factors:

$$G_{i,k} = \frac{R_k(\lambda_i)}{\sum_{l=1}^{n} R_l^2(\lambda_i)},$$

where:
  $R_k(\lambda_i)$ is the relative spectral sensitivity of the wavelength-selective filter k,
  $\lambda_i$ is the effective wavelength,
  i is the column number of the detector,
  k is the number of the wavelength-selective filter, and
  n is the quantity of wavelength-selective filters.

11. The method according to claim 10;
  wherein a detector having an evenly distributed arrangement of at least two wavelength-selective filters is used.

12. The method according to claim 10;
  wherein a color camera sensor is used as a detector.

13. The method according to claim 10;
  wherein an imaging holographic grating or a dispersion prism is used as dispersion element.

14. The method according to claim 10;
  wherein both an imaging holographic grating and a dispersion prism are used.

15. The method according to claim 10;
  wherein a control unit arranged downstream of the detector carries out the determination, evaluation or storage of the signal values of different-colored detector elements.

16. The method according to claim 10;
  wherein the at least one entrance slit and an at least one other entrance slit are oriented perpendicular to a grating structure or to a roof edge of the dispersion element and are offset relative to one another, and
  wherein the partial spectra imaged on the detector are joined by the control unit to form a spectrum.

17. The method according to claim 10;
  wherein the at least one entrance slit and an at least one other entrance slit are oriented parallel to a grating structure or a roof edge of the dispersion element; and
  wherein the partial spectra of the at least one entrance slit and the at least one other entrance slit which are imaged on the detector are acquired separately by the control unit and can be associated with the individual radiation sources when different radiation sources are used.

18. The method according to claim 10;
  wherein the net signal values $S_{i,k}$ of every detector element are determined by the control unit as the difference of the light signal and dark signal; and
  wherein the sum of the spectral intensity values $I_i$ is determined for detector elements with the identical wavelength-selective filter transverse to the dispersion direction.

* * * * *